Sept. 16, 1958  P. J. ICENBICE  2,852,682
TEMPERATURE COMPENSATING MEANS FOR A TUNED CIRCUIT
Filed Oct. 6, 1955  3 Sheets-Sheet 1

INVENTOR.
PHINEAS J. ICENBICE
BY Moody and Goldman
ATTORNEYS

Sept. 16, 1958   P. J. ICENBICE   2,852,682
TEMPERATURE COMPENSATING MEANS FOR A TUNED CIRCUIT
Filed Oct. 6, 1955   3 Sheets-Sheet 2

INVENTOR.
PHINEAS J. ICENBICE
BY Moody and Goldman
ATTORNEYS

INVENTOR.
PHINEAS J. ICENBICE
BY Moody and Goldman
ATTORNEYS

2,852,682

TEMPERATURE COMPENSATING MEANS FOR A TUNED CIRCUIT

Phineas J. Icenbice, Cedar Rapids, Iowa, assignor to Collins Radio Company, Cedar Rapids, Iowa, a corporation of Iowa Application October 6, 1955, Serial No. 538,907

6 Claims. (Cl. 250—40)

This invention relates to temperature compensating means for tuned circuits. In general, the frequency instability of a tuned circuit may be caused by many factors. This invention is concerned with only one of those factors, which is instability due to temperature variation.

Conventionally, temperature compensation has been provided to tuned circuits in oscillators by including a fixed compensating capacitor having a negative temperature coefficient. The negative temperature coefficient of the capacitor is supposed to counteract a positive temperature coefficient caused primarily by circuit parameters of the tuned circuit.

However, where the oscillator is tunable over a wide frequency range, it can be shown that temperature compensation by a fixed capacitor can often only provide compensation at a single frequency within the tunable range. This may be shown by the following analysis: It is generally known that the frequency of a parallel resonant circuit is given by the formula:

$$f = \frac{1}{2\pi\sqrt{LC}} \quad (1)$$

where $f$ is the tuned frequency, L is the inductance in the tuned circuit, and C is the capacitance in the tuned circuit. By taking the partial derivative of frequency with respect to capacitance in formula (1), it is found that:

$$\Delta f = -\frac{f}{2C}\Delta C \quad (2)$$

where $\Delta C$ is an incremental change in capacitance, which might be caused by temperature variation, and $\Delta f$ is the incremental change in frequency caused by the incremental change in capacitance.

The compensation provided by a fixed capacitor is different in permeability tuned circuits and capacitance tuned circuits. In permeability tuned circuits, where C is constant during tuning, although $\Delta C$ is not constant due to temperature variation, it is noted from Equation 2 that a given $\Delta C$ will provide a given $\Delta f$ that varies directly with frequency. At a given temperature in the conventional temperature compensated oscillator, $\Delta C$, therefore, remains fixed over the whole tunable range. Accordingly, it can be seen that at a given temperature, the frequency correction provided by a fixed compensating capacitor will vary with frequency. Consequently, in permeability tuned circuits, it has been found that substantially perfect compensation can generally be provided by a fixed compensating capacitor at only a single frequency within the tuning range.

In capacitance tuned circuits, where L is constant, the partial derivative of Equation 1 may be solved by solving Equation 1 for C and substituting it for C in Equation 2:

$$\Delta f = -2\pi^2 L f^3 \Delta C \quad (3)$$

Therefore, at a fixed temperature that provides a fixed $\Delta C$, $\Delta f$ will vary as a third order function of the tuned frequency. Again, it is apparent that a fixed compensating capacitor can provide temperature compensation at only one point over a wide tuning range.

This invention provides a means for varying the temperature coefficient of a tuned circuit to provide temperature compensation over the whole frequency range of the circuit without regard to whether the circuit is tuned by varying inductance, or capacitance, or both.

It is, therefore, an object of this invention to provide means for varying the temperature coefficient of a compensating capacitor in a tuned circuit to provide temperature compensation over its whole frequency range regardless of the amount of the tuning range.

It is a further object of this invention to provide capacitance translation means for providing temperature compensation for a tuned circuit.

Further objects and advantages of this invention will be apparent to a person skilled in the art upon further study of this specification and drawings; in which.

Now referring to the invention in more detail, Figures 1–5 illustrate a capacitor 10 which has a temperature coefficient that can be varied. The temperature coefficient is the only adjustable feature of capacitor 10, which otherwise has a fixed capacitance. This will be more apparent after the following description of capacitor 10.

Figure 5:
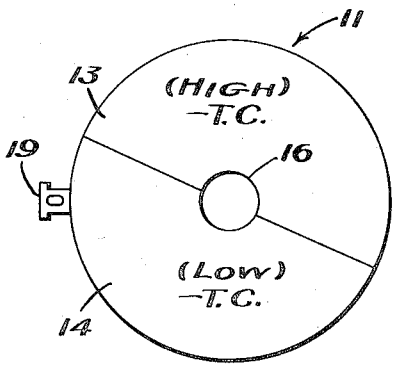
Figure 5 is a top view of another member of the capacitor of Figure 2.

Capacitor 10 includes two dielectric members 11 and 12, both being annular in form. Figure 5 illustrates how dielectric member 12 may be made of two different dielectric materials 13 and 14, which have different dielectric temperature coefficients. Dielectric portions 13 and 14 may each occupy one-half of the circular area of dielectric structure 11.

Generally, negative temperature compensation is required for a tuned circuit. Accordingly, dielectric portion 13 and 14 can be made of dielectric materials having different negative dielectric temperature coefficients; and, for example, portion 13 may have a high negative temperature coefficient, while portion 14 may have a low negative temperature coefficient. However, this invention includes the situation where one portion may have a positive coefficient and the other a negative one, or where one may have a zero coefficient and the other either a positive or negative coefficient.

Figure 3:
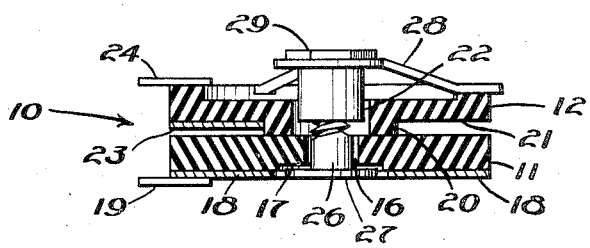
Figure 3 is a sectional view taken along line 3—3 in Figure 1.
Figure 4:
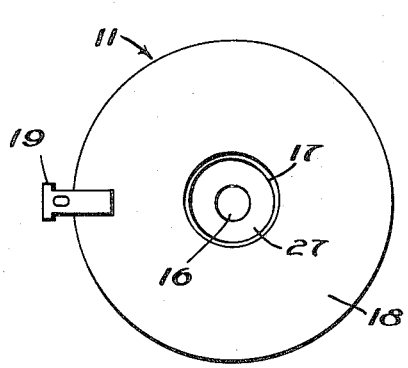
Figure 4 is a bottom view of the capacitor shown in Figure 2.

Dielectric member 11 is formed with a hole 16 axially passing through it and with a countersunk enlarged portion hole 17. An annular plate 18 of conducting material, which may be silverplating, is fixed to the lower surface of dielectric member 11 as shown in Figure 3. A connection tab 19 is supported by dielectric structure 11 and electrically connects to plate 18.

Figure 1:
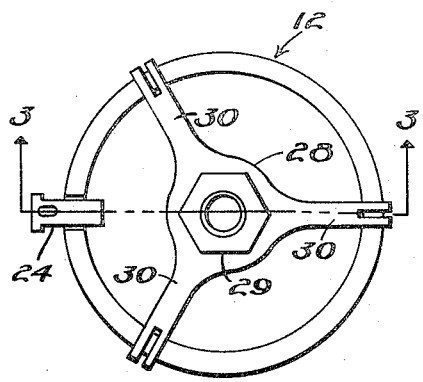
Figure 1 is a top view of a capacitor that may be used by this invention.
Figure 2:
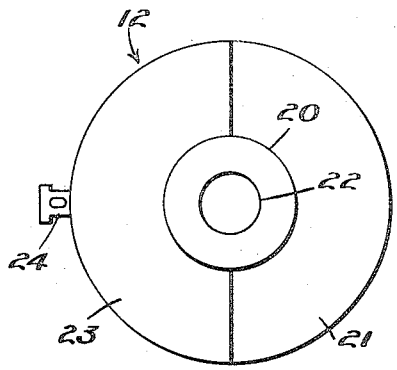
Figure 2 is a bottom view of one member of the capacitor of Figure 2.

The other dielectric member 12 is formed of a single type of insulating material having any sort of dielectric temperature coefficient, since its dielectric temperature coefficient does not enter into the functioning of the invention. The inner side of member 12 is shown in Figure 2, and it has a shoulder 20 of annular form which extends below the general lower surface area 21 of member 12 in Figure 3. A hole 22 is formed axially through member 12.

One-half of the inner surface of dielectric member 12, excluding shoulder 20, is covered with a plate 23, which might be any type of conducting material and may be silverplating. As will be realized later, it is not essential to the invention that plate 23 cover exactly a 180 degree sector of lower surface 21, but it might cover any amount, such as, for example, three-fourths or one-fourth of the surface.

A conducting tab 24 is fixed to the outer edge of dielectric member 12 and electrically connects to plate 23.

The holes 16 and 22 of the dielectric members are aligned in Figure 3, and a bolt member 26 is passed through the holes. The head 27 of bolt 26 is positioned in countersunk hole 17.

A spring member 28, which has three arms 30, is formed centrally with a hole that is received over the threaded end of bolt 26. A nut 29 is threadedly received at that end of bolt 26 and fastens the capacitor together.

Shoulder 20 of dielectric member 12 engages the inner side of dielectric member 11; and accordingly, plate 23 is on the inner side of dielectric member 12. Shoulder 20 slideably engages the other dielectric member 11 for relative movement between members 11 and 12 to prevent wear of plate 23. Spring 28 provides tension on the bearing surface to maintain the plates in an exact spaced alignment.

The dielectric temperature coefficient of capacitor 10 is determined in part by the dielectric material of member 11 between plates 18 and 23, and in part by an air space that is made sufficiently small to be neglected.

Basically, the capacitance of capacitor 10 will be determined by the following factors: the area of plate 23, the spacing between plates 23 and 18, and the integrated dielectric constant of the material between them. This invention does not vary the opposite areas of capacitor 10, nor does it vary the spacing between them, but it only varies the type of dielectric material between the plates. It will be noted when rotating member 11 with respect to member 12 that at one position plate 23 will be completely aligned with dielectric portion 13 having a high negative dielectric temperature coefficient, and that at another rotational position plate 23 will be completely aligned with dielectric portion 14 having a low negative dielectric temperature coefficient. At intermediate rotational positions, varying proportions of the different dielectric portions will be provided beneath plate 23; and accordingly, the resultant dielectric temperature coefficient for capacitor 10 will be intermediate to the temperature coefficients of portions 13 and 14.

The capacitance of capacitor 10, will only be a function of temperature, and may be expressed approximately by the following formula:

$$C = B[A_1(K_m - tK_a) + A_2(K_p - tK_b)] \quad (4)$$

where C is the capacitance of capacitor 10; B is a proportionality constant; $A_1$ is the area of plate 23 subtended by dielectric portion 13; $A_2$ is the remaining area of plate 23 subtended by the other dielectric portion 14; $(K_m - tK_a)$ is the temperature variation of the dielectric coefficient of dielectric portion 13 wherein $K_m$ is a constant, $K_a$ is the rate of change of the dielectric coefficient of portion 13 with temperature and may be either positive or negative, and $t$ is temperature; and $(K_p - tK_b)$ is the variation of the dielectric coefficient of dielectric portion 14 wherein $K_p$ is a constant, $K_b$ is the rate of change of the dielectric coefficient of portion 14 with temperature and also may be positive or negative, and $t$ is the temperature.

The capacitor may be designed for different fixed amounts of capacitance by varying the sector area of plate 23. For example, plate 23 might cover one-fourth of the area of dielectric member 12 rather than one-half of the area as shown. Therefore, the capacitance in this situation will be one-half of the capacitance of the above-described capacitor 10; and its temperature coefficient can be adjusted in the same manner, since at one time the one-fourth size plate may be entirely over dielectric portion 13 and at another time it may be entirely over the other portion 14. Accordingly, intermediate coefficients may be provided between these extreme values.

As stated above, it is difficult, if not impossible, to provide perfect temperature compensation for a tuned circuit having a wide frequency range when using a fixed capacitor to provide the compensation. This arrangement will generally provide perfect temperature compensation only at a single frequency within the range.

In certain cases, however, it may be required for a tuned circuit to have substantially perfect temperature compensation at all frequencies within its range. This can be provided by the form of the invention shown in Figures 6-9, where a knob 40 is provided which tunes the frequency of a resonant circuit 41 either by varying its capacitor 42 or by varying the permeability of its inductor 43; and the latter situation is shown in Figure 6.

Figure 6:
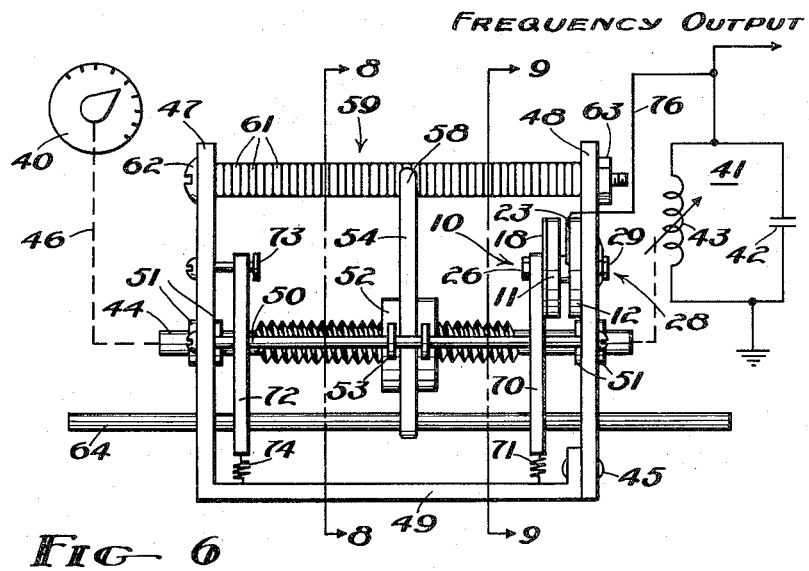
Figure 6 is a side view of one form of the invention.

A shaft 44 is rotated by knob 40, and they may be coupled by a mechanical transmission 46, shown schematically in Figure 6. Shaft 44 is rotatably supported by end portions 47 and 48. Portion 48 is made of insulating material and is fastened by rivets 45 to a bottom portion 49 which is formed with end portion 47 at its other end. It is, of course, understood that the frame support may have any configuration, and the U-shaped frame in the drawings is merely used for purposes of illustration. Shaft 44 is axially fixed with respect to end portions 47 and 48 by means of snap-rings 51, which are fixed to shaft 44 adjacent to the opposite sides of each frame end portion.

A follower nut 52 is threadedly received on shaft 44 and is longitudinally moved by rotation of shaft 44; and a bifurcated arm 53 is fastened rigidly at one end to follower 52. A rigid stabilizing rod 50 is fastened between frame ends 47 and 48 and is slideably received through openings 55 in arm 53. Rod 50 prevents rotational motion by nut 52 and arm 53, but permits longitudinal movement.

A lever member 54 is received within a slotted end of arm 53 and is pivotally fastened by a pin 57. The upper end 58 of lever member 53 engages a flexible cam arrangement 59.

Cam 59 is composed of a large plurality of elliptically shaped washers 61 that are each formed with an elliptically shaped hole. The washers are stacked adjacent to each other between frame end portions 47 and 48. A bolt 62 passes through all of them and clamps them together between the frame ends with the assistance of a nut 63, received on a threaded end of bolt 62. The adjustment of the variable cam surface will be explained below.

A long, narrow, rigid rod 64 is fastened centrally to the bottom end of lever member 54 in Figure 6. The opposite ends of rod 64 extend through elongated openings 40 in frame end portions 47 and 48 to permit transverse movement by rod 64.

The capacitor 10, which has an adjustable temperature coefficient as described above in connection with Figures 1-5, is fastened to insulating end frame portion 48. The dielectric members 11 and 12 of capacitor 10 may be placed on one side of the dielectric frame portion, and spring member 28 may be placed on the opposite side with the bolt 26 passing through all members and with locknut 29 fastening capacitor 10 to frame end 48.

In the arrangement shown in Figure 6, dielectric member 12 is mounted against the insulating frame portion 48 and is rotationally fixed thereto by means of an insulating cement, for example. The other dielectric member 11 is rotationally supported on bolt 26.

A conducting arm member 70 is fastened at one end to dielectric member 11 and is electrically connected to plate 18. Arm 70 extends downwardly in Figure 6 and engages the side of rod 64, as may be seen best in Figure 9. A spring 71 is fastened between the end of arm 70 and the frame member 49 and provides a conducting path from arm 70 to ground. A counterbalancing arm 72 is pivotally supported from frame end 47 by a projection 73; and a spring 74 connects between the end of arm 72 and frame portion 49 to provide a force on rod 64 that counterbalances first spring 71.

Accordingly, capacitor plate 18 is grounded through arm 70 and spring 71, but the other plate 23 is not grounded; and a lead 76 connects plate 23 to the other ungrounded side of tuned circuit 41 as shown in Figure 6.

Cam 59 is composed of individual washers 61 that may be adjusted individually without affecting the settings of other washers 61. This is done by loosening nut 63, which clamps the washer together, but sufficient tension is left among the washers to permit transverse sliding between them.

An oscillator having the tuned circuit may now be calibrated for temperature compensation as an example.

It can be realized that the position of the follower nut 52 and accordingly the positions of cam follower 58 will be a function of the frequency setting of the oscillator, since it is controlled by frequency control knob 40. First, the oscillator is set at some particular frequency, which may, for example, be the lowest frequency setting, where cam follower 58 engages a particular washer 61. This washer is then adjusted to the position where no frequency variation occurs with temperature by heating and cooling the oscillator apparatus between the required extreme temperature. Consequently, this washer sets capacitor 10 at the proper temperature coefficient for that given oscillator frequency. Capacitor 10 is actuated by the cam through lever member 54, rod 64, and arm 70. Whenever the oscillator is reset to that frequency at a future date, capacitor 10 will be actuated to the dielectric temperature coefficient which provides substantially perfect temperature compensation at that frequency.

Figure 7:
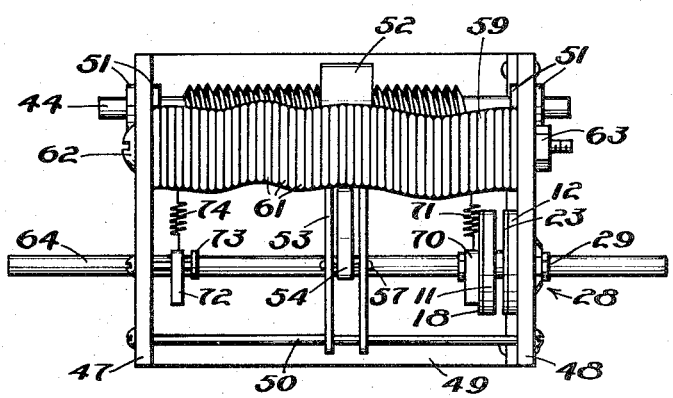
Figure 7 is a top view of the invention shown in Figure 6.
Figures 8, 9:
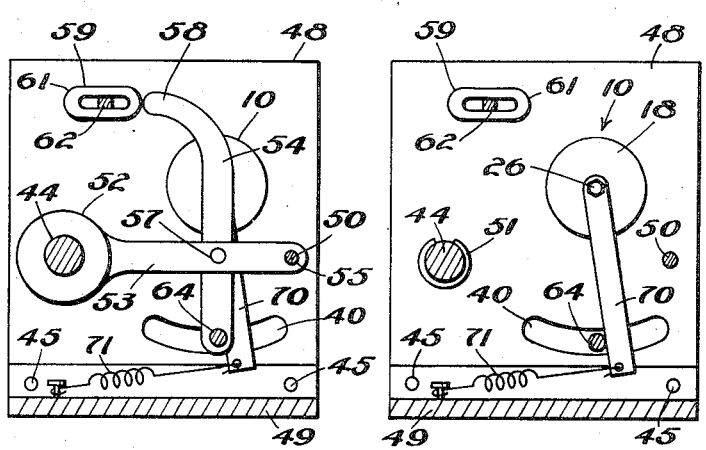
Figure 8 is a sectional view taken along line 8—8 in Figure 6.
Figure 9 is a sectional view taken along line 9—9 in Figure 6.

After the oscillator is calibrated at the first chosen frequency, a second frequency may be chosen; and the same procedure may be used to position the particular washer engaged at that frequency. In this manner, other washers 61 of the cam 59 may be adjusted, and they will provide a curved contour along the cam periphery, as shown in Figure 7. Thus, temperature compensation is provided throughout the frequency range of the tuned circuit with the dielectric temperature coefficient of capacitor 10 being varied as required to provide substantial compensation at all frequencies. The washers are made thin so that their thickness will cause negligible error; and the cam contour is substantially smooth.

Figure 10:
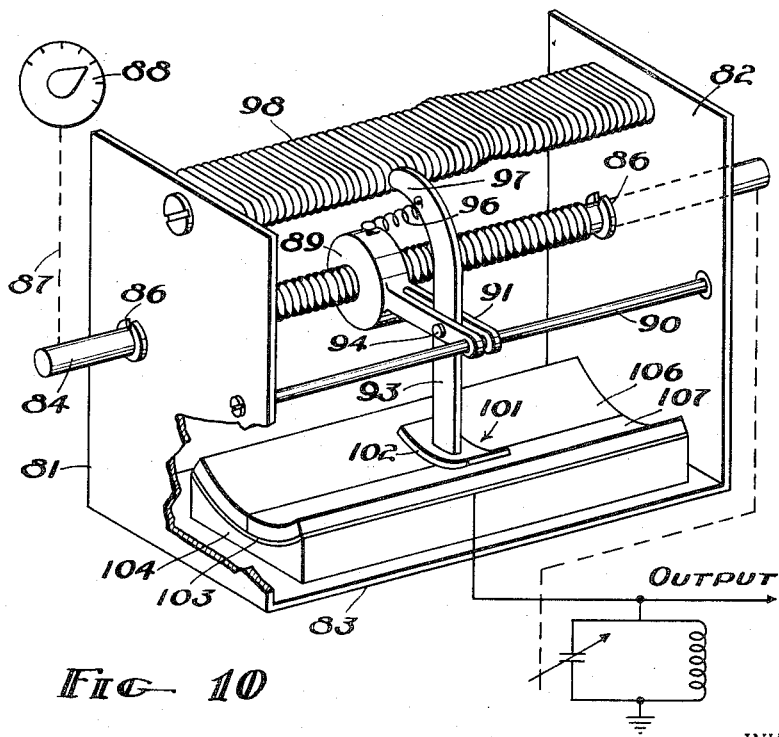
Figure 10 is a perspective view of another form of the invention.

Another form of the invention is shown in Figure 10. It has a motion translating mechanism that is similar to that explained in connection with Figures 6–9. A frame member is provided having end portions 81 and 82 and bottom portion 83. A threaded shaft 84 is rotatably received through the end portions 81 and 82 of the frame and is fixed axially with respect to the frame by means of snap-rings 86, which are fastened to shaft 84 adjacent to the frame end portions.

Shaft 84 is coupled through gear reduction means 87 to a tuning knob 88 that might tune an oscillator, for example.

A follower nut 89 is threadedly received on shaft 84 and is longitudinally actuated by shaft rotation. A bifurcated arm 91 is fastened rigidly at one end to follower nut 89, and the other end of bifurcated arm 91 has openings that slideably receive a rigid stabilizing rod 90, that is fastened at its ends to the frame ends portions 81 and 82.

A lever member 93 passes through the center of bifurcated arm 91 and is pivotally supported there by a pin 94. A spring 96 fastens between lever member 93 and the follower nut 89 to load the lever member so that the cam follower end 97 of lever member 93 engages an adjustable cam 98. Cam 98 is similar to cam 51, described above in connection with Figures 6–9, and is formed of elliptical washers fastened between frame ends 81 and 82 by a bolt means.

The form of the invention in Figure 10 differs from the previously described form of the invention in Figures 6–9 primarily in the type of temperature compensating capacitor used. In Figure 10, a capacitor 101 has a small movable plate 102 rigidly fastened and electrically grounded to the lower end of lever member 93. Plate 102 is relatively short in its longitudinal dimension and it has a circular contour in the transverse dimension with a radius determined by its distance to pivot pin 94. The other plate 103 of capacitor 101 has a circular contour in the transverse dimension parallel to first plate 102 and also has a radius determined by its distance to pivot pin 94. Plate 103 has a longitudinally dimension slightly longer than the longitudinal movement of follower nut 89 and is supported on frame portion 83 by an insulating block 104 that has a curved upper surface which supports capacitor plate 103.

A pair of dielectric portions 106 and 107 are fastened to the upper side of plate 103 as shown in Figure 11, and they have a circular contour that is parallel to both condenser plates. Their line of separation is parallel to shaft 84. Dielectric portion 106 may have a high negative temperature coefficient, while the other dielectric portion 107 may have a low negative temperature coefficient; or any other two types of dielectric temperature coefficients may be chosen as required by a particular situation. Dielectric portions 106 and 107 are dimensionally equal with the same longitudinal length as lower plate 103.

Spring 96 biases cam follower 97 against the adjustable cam 98; and as the follower nut moves longitudinally, the cam follower engages transversely varying portions of the cam periphery which transversely actuate upper cam plate 101 so that the proper proportions of the two dielectrics 106 and 107 are selected to provide the required resultant temperature correction. Thus, Formula 4 above holds wherein $A_1$ is the amount of area of plate 101 adjacent to dielectric portion 106; and $A_2$ is the remaining area of upper plate 101 that is over the other dielectric portion 107. The form of the invention in Figure 10 may be calibrated in the same manner as described for the invention in Figures 6–9.

In the production of an oscillator or other tuned circuit using the present invention, a preliminary model may be built using the adjustable cam of washers; and afterwards, a fixed cam having the same contour may be used in production models to provide substantial temperature compensation.

It is, therefore, apparent that this invention provides a means for controlling the temperature compensation of a tuned circuit, such as may be found in an oscillator. It is further apparent that this invention provides means for adjusting a capacitor having a variable dielectric temperature coefficient as a function of frequency to compensate a tuned circuit which may have an extraordinary wide tuning range.

While particular forms of the invention have been shown and described, it is to be understood that the invention is capable of many modifications. Changes, therefore, in construction and arrangement may be made without departing from the spirit and scope of the invention as given by the appended claims.

What is claimed is:

1. Temperature compensating means for a frequency-variable tuned-circuit having a tuning element comprising a capacitor having an adjustable temperature coefficient dielectric, said capacitor being additional to said tuning element, a cam having a preformed peripheral surface, a cam-follower engaging the peripheral surface of said cam at a longitudinal position that varies with the frequency setting of said tuned-circuit, the cam periphery formed with transverse variations that are related to the temperature compensation required at the frequencies corresponding to the cam follower positions, and motion translating means connecting the cam follower to the capacitor for varying the temperature coefficient setting of the capacitor accordingly to the transverse variations formed in the cam periphery, whereby temperature compensation is obtained substantially over the entire tuning range of the tuned circuit.

2. Temperature compensating means for a frequency-variable tuned-circuit having a tuning element comprising a capacitor having an adjustable temperature coefficient, said capacitor being separate from said tuning element, frame support means, a threaded shaft supported rotatably by said frame support means, the rotational position of the threaded shaft controlled by the frequency setting of the tuned-circuit, a cam supported substantially parallel to said threaded shaft by said frame support means, a cam-follower actuated longitudinally by the rotational movement of said threaded shaft, the cam-follower engaging the periphery of said variable cam at a position that is a function of frequency, and means for coupling said cam-follower to said capacitor to vary its temperature coefficient, and the periphery of said cam formed with a contour that varies with the temperature compensation required by the tuned circuit over its tuning range.

3. Temperature compensating means for a frequency adjustable tuned-circuit having a tuning element comprising frame support means, a shaft supported rotatably by said frame support means, an adjustable cam, including a plurality of stacked washers supported by said frame support means, tuning means for said tuned circuit connected to said shaft to rotationally position in response to the frequency setting of the tuned-circuit, a cam follower engaging the periphery of the variable cam, means for moving the cam-follower longitudinally as a function of shaft rotation, a capaictor having an adjustable temperature coefficient, said capacitor being separate from said tuning element means connecting said cam-follower to said capacitor to vary the temperature coefficient of the capacitor in accordance with the engaged periphery of said cam, and said cam adjusted to a contour that obtains temperature compensation for the tuned-circuit at substantially every frequency setting.

4. Temperature compensating means for a tuned-circuit having a variable tuning means and comprising a frame support, a threaded shaft rotatably supported by said frame support and rotatively connected to said tuning means, a follower-nut threadedly received on said shaft, means for preventing rotation by said follower nut, an arm fixed to said follower nut, a cam-follower pivotally supported by said arm, an adjustable cam supported by said frame means, said cam-follower engaging the surface of said cam, a capaictor with an adjustable temperature coefficient comprising a pair of annular metallic discs rotatable relative to each other, said capacitor being separate from said variable tuning means, one of the discs being angularly smaller than the other, two types of dielectric material having different temperature coefficients supported between said discs, and means for coupling the cam-follower to the capacitor to rotationally position the smaller disc relative to the dielectric means, whereby the tuned-circuit is substantially temperature compensated over its whole tuning range.

5. Temperature compensating means for a tuned circuit comprising mechanical tuning means coupled to said tuned-circuit for varying a tuning element over a wide frequency range, frame support means, an adjustable cam supported by said frame support means, a shaft rotatively supported by said frame support means and connected rotatively to said tuning means to be rotated as a function of tuned frequency, a follower-nut threadedly received on said shaft, a follower arm fixed at one end to said follower-nut, a cam-follower pivotally supported by said arm with one end biased against said cam, a stabilizer rod fixed to said frame support means and slideably received through a hole in said arm to prevent rotational movement by said follower nut, an actuating rod transversely fixed to said cam-follower, a capacitor having a rotatable portion that is adjustable to vary the temperature coefficient, said capacitor being separate from said tuning element, a capacitor arm fastened to the rotatable portion of said capacitor, said capacitor arm engaged slideably by the actuating rod, wherein transverse movement of said actuating rod adjusts the temperature coefficient of said capacitor, and the engaged surface of said cam is adjusted to a contour that controls the capacitor to obtain the required temperature coefficient for the tuned-circuit as the tuned frequency is varied.

6. Temperature compensating means for a tuned-circuit comprising a tuning means coupled to said tuned-circuit for varying its tuned frequency, a frame support, an adjustable cam fastened to said frame support, a shaft rotatably supported by said frame support and rotationally connected to said tuning means, a follower nut threadedly received on said shaft, a follower arm fixed at one end to said follower nut, a stabilizing rod fixed to said frame support and received slideably through said follower arm parallel to said shaft to prevent rotational movement of said follower arm, a cam follower pivotally supported by said follower arm, spring means biasing one end of said cam follower against the periphery of said cam, a first capacitor plate fastened to said cam follower, the cam follower and first capacitor plate transversely moved by variations in the engaged preiphery of said cam and longitudinally moved by rotation of said shaft as a function of the tuned-frequency, a second capacitor plate insulatingly supported by said frame support in parallel relationship with the first capacitor plate, a pair of dielectric portions longitudinally fixed to the second plate and spaced between said pair of plates, one of the dielectric portions having a different temperature coefficient than the other dielectric portion, the line of separation between said dielectric portions being parallel to said shaft, and the engaged cam periphery formed as a function of required temperature compensation with tuned-frequency variation, whereby the amount of the dielectric portions between the capacitor plates is varied by movement of the cam-follower along the cam periphery to substantially compensate temperature effects in the tuned-circuit.

References Cited in the file of this patent

UNITED STATES PATENTS

| | | |
|---|---|---|
| 1,976,571 | Loftis | Oct. 9, 1934 |
| 2,499,634 | Ehlers et al. | Mar. 7, 1950 |
| 2,641,709 | Stover | June 9, 1953 |
| 2,669,699 | Shapiro | Feb. 16, 1954 |